March 29, 1938. J. H. HOFFMANN 2,112,492
APPARATUS FOR USE IN THE MANUFACTURE OF CEMENT
Filed Nov. 7, 1935
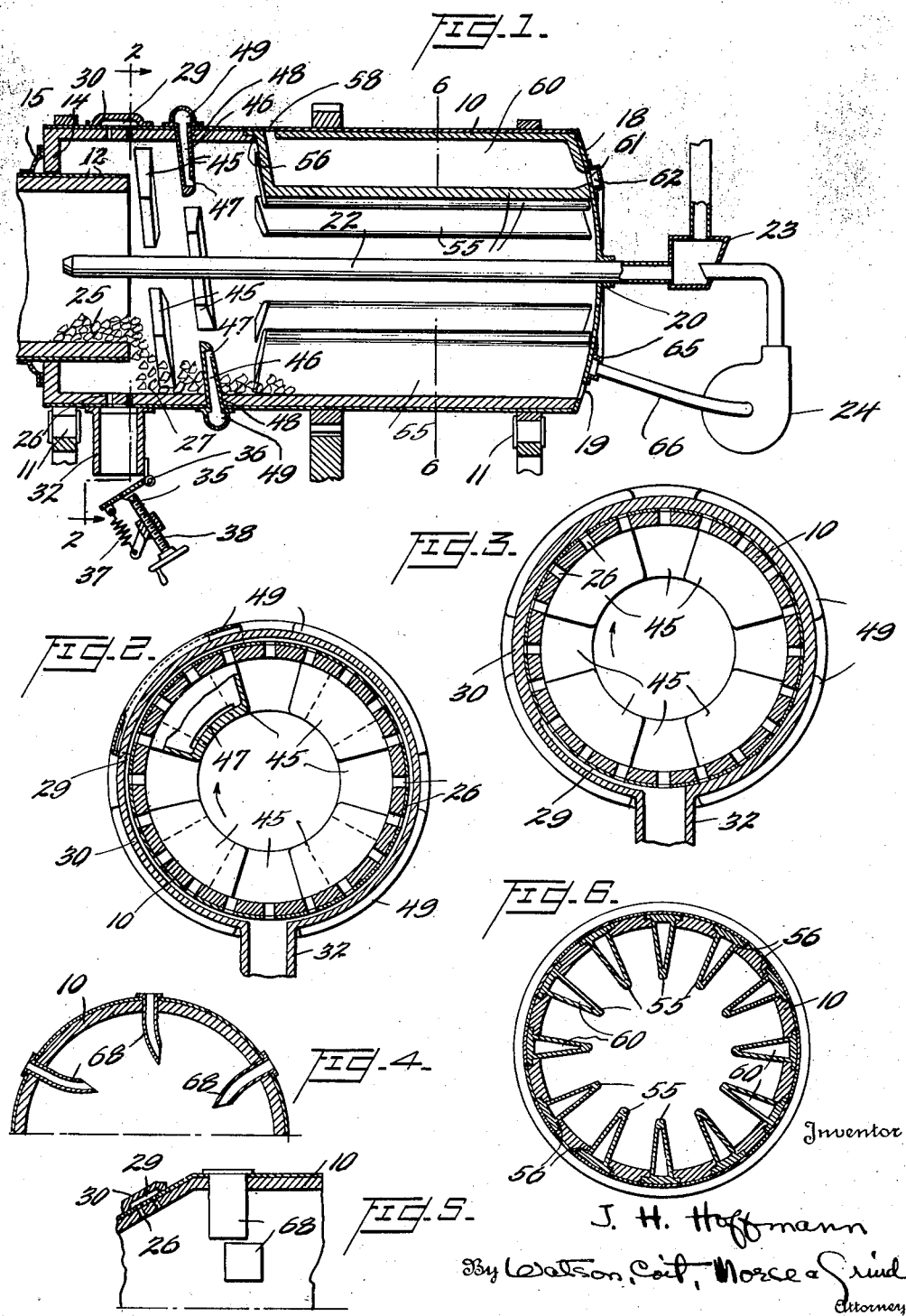

Patented Mar. 29, 1938

2,112,492

UNITED STATES PATENT OFFICE 2,112,492

APPARATUS FOR USE IN THE MANUFACTURE OF CEMENT

Joseph H. Hoffmann, Bethlehem, Pa., assignor to G. Polysius Aktiengesellschaft, Dessau, Germany, a corporation of Germany Application November 7, 1935, Serial No. 48,741

18 Claims. (Cl. 263—32)

This invention relates to the production of cement and has for its principal object the provision of apparatus for use with a cement kiln or furnace to more effectively and inexpensively cool the kiln product and to improve the efficiency of the kiln.

It is common practice in the production of cement by the burning of the raw cement material in a kiln to employ a cooler into which the cement clinker is introduced as it discharges from the kiln, the clinker being thus brought to a reduced temperature suitable for the grinding or pulverizing operation. For this purpose air is passed through the cooler in intimate contact with the clinker, and since the air thereby acquires a high temperature, it is ordinarily delivered from the cooler into the kiln to aid in the combustion, the efficiency of the kiln being thus increased by the use of preheated air. It is also conventional practice to employ in such coolers the counterflow principle, the current of air in the cooler moving from the clinker discharge end to the clinker inlet end of the cooler, whereby as the air becomes heated to higher temperatures it is progressively contacted with clinker of higher temperature, the principle and advantages of such a process being well-known and frequently utilized in heat exchange devices of widely varying nature and purpose. However, the application of the counterflow principle to the cooling of cement clinker, while effecting most efficient cooling from the standpoint of heat exchange economy, does not result in the production of clinker in a form in which it can be most effectively ground or pulverized. Thus it is found that rapid and sudden quenching of the clinker from the maximum temperature acquired thereby effects some desirable change in the clinker structure which facilitates subsequent grinding, resulting in a more uniformly ground product and reducing the power required for the operation of the grinding apparatus and consequently the expense. Possibly this rapid quenching results in some form of crystallization of the clinker structure whereby it is rendered more friable. Of course, this rapid quenching cannot be effected by employment of the counterflow principle, since the clinker delivered to the cooler first encounters the relatively hot air which has absorbed heat from passage through the cooler, and the clinker is not contacted with unheated air until it reaches the discharge end of the cooler, the cooling of the clinker being quite gradual.

It is therefore proposed as part of the present invention to deliver clinker directly from the kiln to the cooler and to cause cool air to contact the clinker as it enters the cooler, whereby the quenching of the clinker may be effected rapidly from the maximum temperature attained by the clinker, and the foregoing advantages attained. In the preferred form of the invention a cooler of the rotary drum type is provided, the inlet end of the drum being arranged in close proximity to the clinker discharge end of the kiln, so that the clinker may fall from the kiln into the cooler. An air inlet is provided adjacent the inlet end of the cooler, this air inlet being so formed as to direct cooling air into contact with the hottest clinker, the arrangement preferably being such that the air passes completely through the falling clinker to ensure intimate and complete engagement between the entire mass of clinker and the cool air. As the result of contact with the clinker, the air is heated to a temperature sufficiently high for efficient use in the kiln, and is introduced therein to aid in the combustion, the employment of preheated air from the cooler for secondary combustion air in the kiln being an expedient commonly adopted.

In order that the quenching of the clinker may be quite rapidly and completely effected from the maximum clinker temperature, the quantity of air flowing through the air inlet aforementioned should be fairly large. It is obvious, however, that the introduction of a large quantity of air into the cooler at a point so close to the delivery end of the kiln is likely to exert a very pronounced effect on the combustion processes which take place in the kiln, and that if air is supplied under pressure to the inlet, as is common practice in the delivery of air to clinker coolers, regulation of the air flow in such manner that efficient kiln combustion is ensured may prove quite difficult. It is therefore one of the objects of the present invention to avoid this difficulty by supplying air to the inlet at normal or atmospheric pressure, the normal draft through the kiln being relied on to cause flow of air through the inlet. Thus the quantity of air entering the inlet is made to depend upon the reduced pressure obtaining at the clinker discharge end of the kiln and therefore, to a reasonable extent, on combustion conditions in the kiln. In other words, if combustion is retarded in the kiln, the draft through the kiln is reduced and less secondary air is supplied through the cooler inlet, whereas if combustion is increased, more secondary air is drawn into the cooler and delivered to the kiln to meet the increased demand. Thus by relying solely on the kiln draft for the introduction of secondary air, a fairly effective regulating action is obtained and the use of a complicated control system is avoided, the unusually close proximity of the air inlet to the kiln ensuring prompt and positive regulatory action such as would be impossible to secure if the air inlet were more remote from the kiln. In addition, the consumption of power required for the operation of an air pump or the like is avoided.

Since it is proposed in the preferred form of the invention to direct the air entering the cooler in the manner described through the falling clinker as it is delivered to the kiln, the flow of air through the inlet will be retarded to a greater or less extent by the quantity of clinker entering the kiln, and it is obvious that if only a small amount of clinker or no clinker is being delivered at any given time, the quantity of air entering the inlet may momentarily exceed that required for proper combustion in the kiln. To compensate for such fluctuation in the delivery of clinker, it is proposed as part of the present invention to provide means acting automatically to throttle the air flow whenever the latter tends to become excessive, for instance by the association with the air inlet of a simple form of loaded damper.

The invention also contemplates further improvements in the cooler which will extend the life of the cooler and assist in the delivery of combustion air to the kiln. Thus it is a further feature of the invention that agitation of the clinker and delivery thereof toward the discharge end of the cooler is effected by inwardly directed projections which are provided with air passages through which additional secondary air may be introduced into the cooler, the projections moving through the clinker as the cooler is rotated and serving to cool the latter and being themselves cooled by the air as it passes therethrough. Preferably these projections are so constructed that they may be readily removed from the exterior of the kiln for inspection and repair or for replacement. Baffles are also preferably provided to retard the movement of clinker through the cooler to afford sufficient time for complete cooling, and it is proposed to cause a flow of air through passages within these baffles, the air being thereafter delivered to the usual combustible mixture supply means for the kiln and thus serving as primary combustion air, or being supplied to other apparatus requiring preheated air, the baffles being thereby cooled and the primary air preheated.

Further objects and features of the invention will be apparent from the following description taken in connection with the accompanying drawing, in which:

Figure 1 is a longitudinal sectional view through a cooler constructed in accordance with the principles of the invention;

Figure 2 is a transverse section taken substantially on the line 2—2 of Figure 1;

Figure 3 is a sectional view corresponding to Figure 2 and illustrating a slightly modified arrangement;

Figures 4 and 5 are fragmentary transverse and longitudinal sectional views respectively illustrating a further modification; and Figure 6 is a transverse sectional view taken substantially on the line 6—6 of Figure 1.

In order to facilitate an understanding of the invention, reference is made to the preferred embodiment thereof illustrated in the accompanying drawing and specific language is employed. It will nevertheless be understood that no limitation of the invention is thereby intended but that various alterations and further modifications are contemplated such as would occur to one skilled in the art to which the invention relates.

It will be observed that the cooler shown in the drawing is of the rotatable drum type, the drum, indicated at 10, being preferably supported on rollers 11 or in any other convenient manner whereby rotation independently of the kiln may be readily effected if desired; alternatively, the drum may be secured to or form part of the kiln so as to partake of rotation with the latter. The kiln 12 selected for the purpose of illustration is of the conventional rotary type, only the clinker discharge end of the kiln being shown. The kiln and cooler are disposed in close proximity, the discharge end of the kiln preferably projecting into the cooler as illustrated herein, an annular end flange 14 formed on the cooler 10 and suitable sealing means 15 effecting a fairly tight joint between the kiln and the cooler while allowing relative rotation thereof. That end of the cooler remote from the kiln is provided with a closure member 18 having openings 19 therein through which the cooled clinker may be discharged and having an opening 20 which is centrally disposed to permit the passage therethrough of a conduit 22 through which a combustible fuel mixture may be supplied to the kiln for the burning of the cement material therein. A conventional mixing chamber 23 in which suitable fuel such as powdered coal or the like and air under pressure are introduced and formed into an intimate mixture delivers fuel to the conduit 22, the air under pressure being supplied from a blower 24. The specific construction of this mixing device constitutes no part of the present invention and may be modified as desired.

As shown in Figure 1, the clinker 25 which has been formed by the burning of the cement material in the kiln 12 is discharged from the lower end of the kiln and falls as indicated at 27 into the cooler. At a point closely adjacent to and on the kiln side of the falling clinker, the cooler 10 is provided with an inlet 26 which may comprise a plurality of openings in the wall of the cooler. Air may be supplied to the air inlet 26 from an annular chamber 29 constituted by a recess in the annular member 30, the latter being retained against rotation by any suitable means and being preferably in sealing engagement with the periphery of the cooler 10. A conduit 32, communicating directly with the atmosphere and with the chamber 29 conveys air to the chamber and thence through the inlet 26 into the cooler. As the air enters the cooler it is immediately contacted with the falling clinker and, as will be observed from Figure 1, at least a portion of the air is caused to pass completely through the falling clinker. If desired, the apertures which comprise the inlet 26 may be tangentially disposed so as to produce a swirling motion of the incoming air about the peripheral portion of the cooler, whereby the air may be caused to sweep through the clinker before passing into the main portion of the cooler and into the kiln. The intimate contact between the clinker and the air which is thus effected while the clinker has an extremely high temperature results in rapid quenching with the attendant advantages hereinbefore indicated.

As hereinbefore explained, it is preferred to avoid the use of blowers or the like for supplying air under pressure to the inlet 26, the natural draft in the kiln and the resultant reduced pressure established at the clinker discharge end of the kiln being relied upon to cause flow of air through the inlet. In order to avoid the delivery of excessive quantities of air through the inlet, such as might interfere with proper combustion in the kiln, a damper 35 may be associated with the conduit 32, this damper being hinged as at 36 and being controlled manually if desired. Preferably the damper 35 is loaded, for instance by means of a spring 37 which normally acts to maintain the damper in an open position. It will be appreciated that as the velocity of air flowing through the conduit 32 and the inlet 26 increases, the damper will tend to swing inwardly against the action of the spring 37 and will thus exert a throttling action. An adjustable device 38 constituting an abutment for engagement with the damper 35 may be regulated to limit the outward movement of the damper so that the amount of air flowing through the conduit 32 and serving as secondary combustion air in the kiln will not be greater than required for maximum efficiency.

The construction just described may of course be modified to a considerable extent without departing from the principles of the invention as hereinbefore outlined. Thus it will be observed by reference to Figure 3 that the member 30 may be altered so that the chamber 29 from which air is supplied to the inlet 26 extends only partially about the periphery of the cooler, the remaining portion of the cooler periphery being sealed by the member 30, whereby flow of air through the perforations which constitute the inlet 26 may be limited to that portion of the kiln into which clinker is actually falling, whereby substantially all of the air entering through the inlet 26 may pass completely through the falling clinker. With a construction of this nature, the employment of a regulating damper or throttle valve such as that shown in the drawing is important since variations in the amount of clinker discharging at any instant from the kiln may seriously affect the quantity of incoming air and thereby impair proper combustion in the kiln.

Returning now to Figures 1 and 2, it will be observed that as the clinker passes into the cooler, it is engaged by a plurality of projections 45 which serve to agitate and to slowly forward the clinker toward the clinker discharge end of the cooler. Preferably these projections are constructed to permit flow of air therein and for this purpose are provided with passages 46 extending therethrough, each passage communicating at one end with the exterior of the cooler and at the other end through an elongated aperture 47 with the interior of the cooler, the apertures 47 being preferably formed in that face of each projection which is directed away from the kiln, in order to maintain the air in the cooler for a longer period of time. It will be appreciated that the air flowing into the cooler through the passages 46 not only serves to augment the secondary combustion air entering through the inlet 26 but also serves to maintain the projections 45 at a lower temperature to permit absorption of heat from the clinker as the projections pass through the clinker. Again, the maintenance of the projections at a low temperature ensures longer life and prevents premature burning out and frequent replacements.

Repair and replacement of the projections 45 is, however, necessary from time to time in spite of any precautions which may be taken to maintain them at a low temperature. It is consequently preferred to form these projections separately from the cooler and to insert them through apertures 48 in the peripheral wall of the cooler, the projections being removably retained in position in any convenient manner. The apertures 48 may be tapered inwardly to facilitate withdrawal of the projections from the exterior of the kiln when necessary. Each projection is furthermore provided at its outer end with a baffle portion 49 which is so constructed as to cause a current of air to flow through the passages 46 when the cooler is rotated.

In order to facilitate further cooling of the clinker, a plurality of baffles 55 are provided, these baffles extending inwardly from the peripheral wall of the cooler and being disposed generally longitudinally of the cooler. Thus as the cooler is rotated, the baffles will successively engage and lift the clinker, but will not exert any forwarding action thereon. Each baffle 55 is preferably removably received in a longitudinally extending slot 56 in the cooler wall and may be withdrawn from the cooler for repair or replacement from the exterior thereof. Each baffle 55 is further provided with an inlet opening 58 communicating with the exterior of the kiln and with a passage 60 extending longitudinally of the baffle, the passage 60 and the several baffles communicating through apertures 61 in the closure member 18 with an annular chamber 62 formed in a member 65 which is provided with a sealing fit against the outer face of the closure member 18 and which is suitably retained against rotation. A conduit 66 communicates with the annular chamber 62 and with the blower 24. Thus air flowing through the passages 60 in the baffles 55 serves to protect the baffles and prevent premature burning thereof, to complete the cooling of the clinker after the initial rapid quenching, and to supply preheated air for use as primary air in the combustible mixture. Alternatively, conduit 66 may be omitted or may be associated with other mechanism for supplying heated air thereto.

A slightly modified form of projection for use near the clinker inlet end of the kiln is illustrated in Figures 4 and 5, in which these projections are shown as shaped to afford removable scoops or lifters 68, having the wider faces thereof disposed generally radially and longitudinally of the cooler. These modified projections do not materially alter the function of the cooler as hereinbefore described, since they not only serve to agitate the clinker but to forward the clinker toward the discharge end of the cooler owing to their generally helical distribution about the cooler periphery.

In spite of the relative compactness of a cooler of the character herein described, the temperature of the clinker may be quickly reduced to the extent desired for grinding, the efficiency of the kiln may be increased by the use of the heat absorbed from the clinker for preheating both the primary and secondary combustion air, and the clinker is discharged from the cooler in the best condition for grinding by reason of the rapid and effective quenching thereof from the maximum temperature.

Having thus described the invention, what is claimed as new and desired to be secured by Letters Patent is:

1. The combination with a rotary kiln for burning cement material, of a cooler receiving cement clinker from said kiln and discharging preheated air into said kiln to aid combustion therein, said cooler having an air inlet arranged to direct cooling air through the clinker at the point of introduction of the clinker into the cooler, whereby rapid quenching of the clinker from the maximum clinker temperature is effected, and means connecting said inlet with a source of air at substantially constant pressure, whereby the quantity of air passing through said inlet may vary in response to variation in pressure in the material discharge end of said kiln.

2. The combination with a rotary kiln for burning cement material, of a cooler receiving cement clinker from said kiln and discharging preheated air into said kiln to aid combustion therein, said cooler having an air inlet arranged to direct cooling air through the clinker at the point of introduction of the clinker into the cooler, whereby rapid quenching of the clinker from the maximum clinker temperature is effected, said inlet communicating with a source of air at substantially constant pressure, whereby the quantity of air passing through said inlet may vary in response to variation in pressure in the material discharge end of said kiln, and means associated with said air inlet operable automatically to prevent excessive air flow therethrough.

3. The combination with a rotary kiln for burning cement material, of a cooler receiving cement clinker from said kiln and discharging preheated air into said kiln to aid combustion therein, said cooler having an air inlet arranged to direct cooling air through the clinker at the point of introduction of the clinker into the cooler, whereby rapid quenching of the clinker from the maximum clinker temperature is effected, said inlet communicating with a source of air at substantially constant pressure, whereby the quantity of air passing through said inlet may vary in response to variation in pressure in the material discharge end of said kiln, and means associated with said inlet for effecting progressively increased throttling of air passing therethrough as the flow of air increases.

4. The combination with a rotary kiln for burning cement material to form cement clinker, of a rotary cooler supported adjacent said kiln in communication with the material discharge end of said kiln, whereby clinker discharged from said kiln may fall into said cooler and air preheated in said cooler may pass into said kiln to assist in supporting combustion in the latter, and an air inlet in said cooler positioned and directed to pass air completely through the falling clinker, whereby rapid quenching of the clinker from the maximum clinker temperature is effected.

5. The combination with a rotary kiln for burning cement material to form cement clinker, of a rotary cooler supported adjacent said kiln in communication with the material discharge end of said kiln, whereby clinker discharged from said kiln may fall into said cooler and air preheated in said cooler may pass into said kiln to assist in supporting combustion in the latter, and an air inlet in said cooler positioned and directed to pass air completely through the falling clinker, whereby rapid quenching of the clinker from the maximum clinker temperature is effected, said air inlet communicating directly with the atmosphere, whereby air is drawn through said inlet solely as the result of kiln draft.

6. The combination with a rotary kiln for burning cement material to form cement clinker, of a rotary cooler supported adjacent said kiln in communication with the material discharge end of said kiln, whereby clinker discharged from said kiln may fall into said cooler and air preheated in said cooler may pass into said kiln to assist in supporting combustion in the latter, an air inlet in said cooler positioned and directed to pass air completely through the falling clinker, whereby rapid quenching of the clinker from the maximum clinker temperature is effected, said air inlet communicating directly with the atmosphere, whereby air is drawn through said inlet solely as the result of kiln draft, and means automatically operable to regulate air flow through said inlet to prevent excessive flow when the quantity of falling clinker is decreased.

7. The combination with a rotary kiln for burning cement material to form cement clinker, of a rotary cooler supported adjacent said kiln in communication with the material discharge end of said kiln, whereby clinker discharged from said kiln may fall into said cooler and air preheated in said cooler may pass into said kiln to assist in supporting combustion in the latter, an air inlet in said cooler positioned and directed to pass air completely through the falling clinker, whereby rapid quenching of the clinker from the maximum clinker temperature is effected, said air inlet communicating directly with the atmosphere, whereby air is drawn through said inlet solely as the result of kiln draft, and means automatically operable to regulate air flow through said inlet to prevent excessive flow when the quantity of falling clinker is decreased, said last named means comprising a flow controlled throttle valve associated with said inlet.

8. The combination with a kiln for burning cement material to form cement clinker, of a cooler supported adjacent said kiln in communication with the material discharge end of said kiln, whereby clinker discharged from said kiln may fall into said cooler and air preheated in said cooler may pass into said kiln to assist in supporting combustion in the latter, and an air inlet in said cooler positioned and directed to pass air completely through the falling clinker, whereby rapid quenching of the clinker from the maximum clinker temperature is effected.

9. The combination with a rotary kiln for burning cement material to form cement clinker, of a rotary cooler supported adjacent said kiln in communication with the material discharge end of said kiln, whereby clinker discharged from said kiln may fall into said cooler and air preheated in said cooler may pass into said kiln to assist in supporting combustion in the latter, and an air inlet in said cooler positioned and directed to pass air completely through the falling clinker, whereby rapid quenching of the clinker from the maximum clinker temperature is effected, said cooler being provided with inwardly directed projections for agitating the clinker therein, said projections being provided with air passages affording communication between the interior and exterior of the cooler, whereby the temperature of the projections may be reduced to prevent premature destruction thereof and whereby the supply of combustion supporting air passing through said inlet may be augmented.

10. The combination with a rotary kiln for burning cement material to form cement clinker, of a rotary cooler supported adjacent said kiln in communication with the material discharge end of said kiln, whereby clinker discharged from said kiln may fall into said cooler and air preheated in said cooler may pass into said kiln to assist in supporting combustion in the latter, an air inlet in said cooler positioned and directed to pass air completely through the falling clinker, whereby rapid quenching of the clinker from the maximum clinker temperature is effected, means for supplying a combustible mixture to said kiln, said cooler being provided with inwardly directed projections for agitating the clinker therein, said projections being provided with air passages affording communication between the interior and exterior of the cooler, whereby the temperature of the projections may be reduced to prevent premature destruction thereof and whereby the supply of combustion supporting air passing through said inlet may be augmented, and additional inwardly extending projections having passages therethrough, each of said last named passages communicating at one end with the atmosphere.

11. A clinker cooler for use with a cement kiln, said cooler comprising a rotary drum having an inlet for hot clinker at one end and a discharge outlet for cooled clinker at the other end thereof, said drum having a plurality of inwardly directed projections near the inlet end thereof for agitating and forwarding the clinker toward the discharge end, and having a plurality of inwardly directed projections near the outlet end thereof for further cooling the clinker, and means for effecting flow of air through the projections of both groups to cool said projections to an extent sufficient to prevent overheating and premature destruction thereof.

12. A clinker cooler for use with a cement kiln, said cooler comprising a rotary drum having an inlet for hot clinker at one end and a discharge outlet for cooled clinker at the other end thereof, said drum having a plurality of inwardly directed projections near the inlet end thereof for agitating and forwarding the clinker toward the discharge end, and having a plurality of inwardly directed projections near the outlet end thereof, means for effecting flow of air through the projections of both groups to cool said projections to an extent sufficient to prevent overheating and premature destruction thereof, and means whereby air flowing through said first projections may be caused to pass into said cooler and thence into said kiln for utilization as preheated secondary combustion air.

13. A clinker cooler for use with a cement kiln, said cooler comprising a rotary drum having an inlet for hot clinker at one end and a discharge outlet for cooled clinker at the other end thereof, said drum having a plurality of inwardly directed projections near the inlet end thereof for agitating and forwarding the clinker toward the discharge end, and having a plurality of inwardly directed projections near the outlet end thereof, means for effecting flow of air through the projections of both groups to cool said projections to an extent sufficient to prevent overheating and premature destruction thereof, means whereby air flowing through said first projections may be caused to pass into said cooler and thence into said kiln for utilization as preheated secondary combustion air, and means whereby air flowing through said second projections may be isolated from the interior of said cooler and delivered to the combustible mixture supply means for said burner for use as primary combustion air.

14. In apparatus for use with a cement kiln having means for supplying thereto a combustible mixture, the combination with a rotary drum cooler arranged to receive hot clinker from said kiln and to deliver preheated air to said kiln for use as secondary combustion air, of inwardly directed projections in said cooler, said projections extending generally longitudinally of said cooler, each of said projections having a longitudinally extending air passage therein having one end thereof in communication with said combustible mixture supply means, whereby air flowing through said passages may cool said baffles and may be thereby preheated for use as primary combustion air, and means for admitting cool air to said cooler at a point closely adjacent the clinker inlet end of the cooler for effecting rapid quenching of the clinker from a maximum temperature and for supplying highly heated air to said kiln for secondary combustion therein.

15. A clinker cooler for use with a cement kiln, said cooler comprising a rotary drum having an inlet for hot clinker at one end and a discharge outlet for cooled clinker at the other end thereof, said drum having a plurality of inwardly directed projections for agitating and forwarding the clinker toward the discharge end, said projections being formed separately from said drum and constructed for introduction into the interior of the drum through apertures in the drum wall from the exterior of the drum, whereby said projections may be readily removed from said drum for repair or replacement, said projections having apertures therethrough through which air may flow to the interior of the drum to reduce the temperature acquired by the projections and to cool the clinker.

16. A clinker cooler for use with a cement kiln, said cooler comprising a rotary drum having an inlet for hot clinker at one end and a discharge outlet for cooled clinker at the other end thereof, said drum having a plurality of inwardly directed projections for agitating and forwarding the clinker toward the discharge end, said projections being formed separately from said drum and constructed for introduction into the interior of the drum through apertures in the drum wall from the exterior of the drum, whereby said projections may be readily removed from said drum for repair or replacement, said projections having apertures therethrough through which air may flow to the interior of the drum to reduce the temperature acquired by the projections and to cool the clinker, and means associated with each projection for inducing a flow of air through the projection when said drum is rotated.

17. A method of cooling cement clinker produced in a rotary kiln or the like, which comprises causing a current of air to pass completely through the clinker as it emerges from the kiln to rapidly quench the clinker from the maximum temperature acquired thereby, delivering the air thus preheated by passage through the clinker to the kiln for utilization in the burning of the cement material therein, and varying the rate of flow of air through the clinker in accordance with pressure variation at the discharge end of the kiln.

18. A method of cooling cement clinker produced in a rotary kiln or the like, which includes the steps of delivering the clinker from the kiln directly into a quenching zone, causing a current of cool air to pass completely through the clinker in said quenching zone and while the clinker retains its maximum temperature to rapidly quench the clinker, thereafter passing the clinker through an extended cooling zone and causing a current of gas to contact the clinker in said cooling zone to gradually complete the cooling of the clinker.

JOSEPH H. HOFFMANN.